(12) United States Patent
Justus

(10) Patent No.: US 6,802,749 B1
(45) Date of Patent: Oct. 12, 2004

(54) MARINE VESSEL TROLLING AND BATTERY RECHARGING SYSTEM

(76) Inventor: Ty E. Justus, 24500 Waterworld Rd., Robertsdale, AL (US) 36567

( * ) Notice: Subject to any disclaimer, the term of this patent is extended or adjusted under 35 U.S.C. 154(b) by 0 days.

(21) Appl. No.: 10/628,106

(22) Filed: Jul. 28, 2003

(51) Int. Cl.$^7$ ................................................. B60L 11/02
(52) U.S. Cl. ......................................................... 440/6
(58) Field of Search ........................................ 440/6, 84

(56) References Cited

U.S. PATENT DOCUMENTS

| | | | |
|---|---|---|---|
| 1,076,713 A | 10/1913 | Southwick | |
| 1,123,491 A | 1/1915 | Corbin | |
| 3,703,642 A | * 11/1972 | Balaguer | 290/43 |
| 3,806,790 A | 4/1974 | Marshall | |
| 4,405,872 A | 9/1983 | Thomas | |
| 5,224,563 A | 7/1993 | Iizuka et al. | |
| 5,272,378 A | 12/1993 | Wither | |
| 5,483,144 A | * 1/1996 | Marek | 320/126 |
| 5,863,228 A | * 1/1999 | Tether | 440/6 |
| 5,896,022 A | * 4/1999 | Jacobs, Sr. | 320/103 |
| 6,276,975 B1 | * 8/2001 | Knight | 440/2 |
| 6,396,161 B1 | * 5/2002 | Crecelius et al. | 290/36 R |

* cited by examiner

*Primary Examiner*—Stephen Avila
(74) *Attorney, Agent, or Firm*—Richard L. Mikesell; Kelly Lowry & Kelley, LLP

(57) ABSTRACT

A marine vessel trolling and battery recharging system includes an electric generator/trolling device having a propeller. The device is electrically coupled to a battery and extendable downwardly from the marine vessel into the water. When electric power is supplied to the generator/trolling device in a first orientation, the propeller turns and serves as a trolling motor. However, when the generator/trolling device is positioned in a second orientation and the main engine of the marine vessel is powered, the propeller spins freely and serves to recharge the battery of the marine vessel.

5 Claims, 1 Drawing Sheet

MARINE VESSEL TROLLING AND BATTERY RECHARGING SYSTEM

BACKGROUND OF THE INVENTION

The present invention generally relates to trolling motors for fishing boats as well as battery recharging systems. More particularly, the present invention resides in a combination trolling and battery recharging system for marine vessels.

Boats often have a 12 volt electrical system for supplying the needed current when the boat is not operating, or for powering depth finders, lights, etc. At times, boats will include two batteries, one dedicated to the main engine of the boat, and the other directed to such electrical devices.

Early battery drain and discharge can be experienced, particularly in the alternate battery, when such depth finders, lights, etc. are used over a long period of time. Such early battery discharge can also occur if there is no regenerating system in place for the main battery.

Accordingly, there is a continuing need for a marine vessel battery recharging system. Preferably, such a system would serve additional purposes other than merely recharging the battery system. The present invention fulfills these needs and provides other related advantages.

SUMMARY OF THE INVENTION

The present invention resides in a marine battery recharging system which also serves as a trolling motor for the boat. The system comprises an electric generator/trolling device having a propeller. A battery is electrically coupled to the generator/trolling device. The generator/trolling device is attached to an adjustable arm so as to extend downwardly from the marine vessel and into the water at the desired depth. The arm is pivotally connected to a bracket which is attachable to the marine vessel.

Positioning the generator/trolling device in the first orientation and supplying electric power thereto causes the propeller to turn and serve as a trolling motor for the marine vessel. However, when the generator/trolling device is positioned in the second orientation, usually 180° offset from the first orientation, and the marine vessel main engine is powered, the propeller is turned by the water current flowing thereover and the generator/trolling device creates electricity which recharges the battery system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As illustrated in the accompanying drawings for purposes of illustration, the present invention resides is a marine vessel trolling and battery recharging system. The present invention is intended to serve a dual purpose, namely serving as a trolling motor for fishing boats and the like, as well as serving as a battery recharging system for recharging batteries of the marine vessel which are not otherwise recharged during the operation of the vessel.

Figure 1:
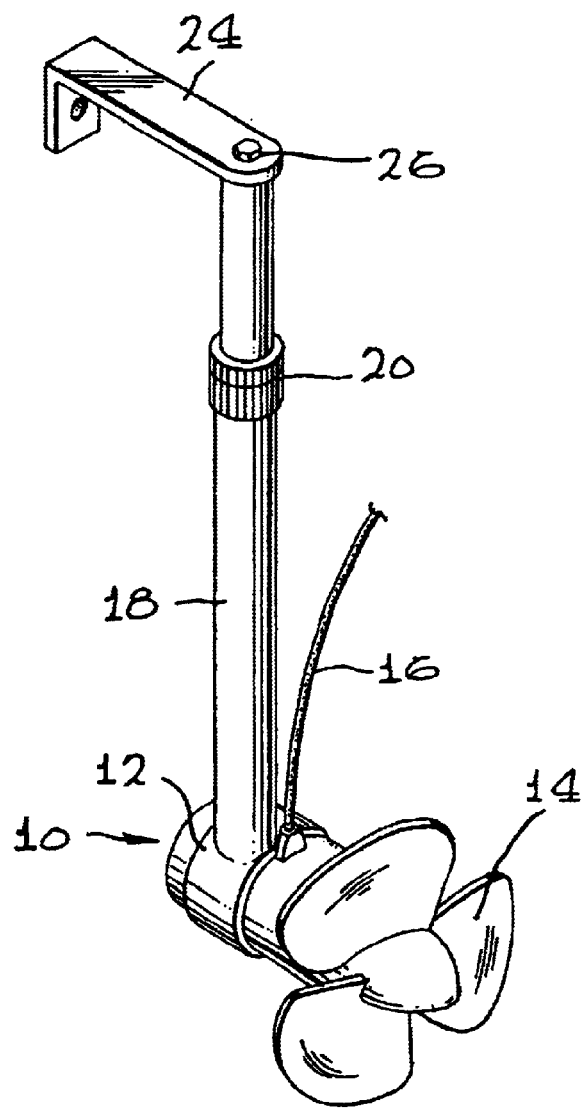
FIG. 1 is a perspective view of a generator/trolling device embodying the present invention.

With reference now to FIG. 1, an electric generator/trolling device, generally referred to by the reference number 10, is. illustrated. The device 10 includes a housing which encases an electric motor 12. Such motor includes a first set of electrical windings or bushings which are fixed in place, as well as a second set of electric bushings or windings which are attached to a shaft, in typical fashion. A propeller 14 is fixed to an end of the shaft and coupled to the housing 12 such that when electrical power is supplied to the device 10, the propeller 14 spins. Electrical power is provided by electrical leads 16. The device 10 is attached to an end of an arm 18 which is preferably adjustable in length. As illustrated, the arm 18 includes a twist clamp 20 which enables the user to adjust the arm length 18 and hand tighten the clamp 20 to maintain that length. The adjustability of arm 18 enables it to be extended downwardly from a marine vessel 22, such as that illustrated in FIG. 2, to the proper water depth.

A bracket, such as the L-shaped bracket 24 illustrated in FIG. 1, interconnects the arm 18 and marine vessel 22. Typically, the bracket is bolted to an upper edge of the marine vessel 22. A swivel connection 26 is made between the arm 1 8 and bracket 24 such that the arm 18 can be rotated to position the device 10 in the desired orientation, as will be described more fully herein.

Figure 2:
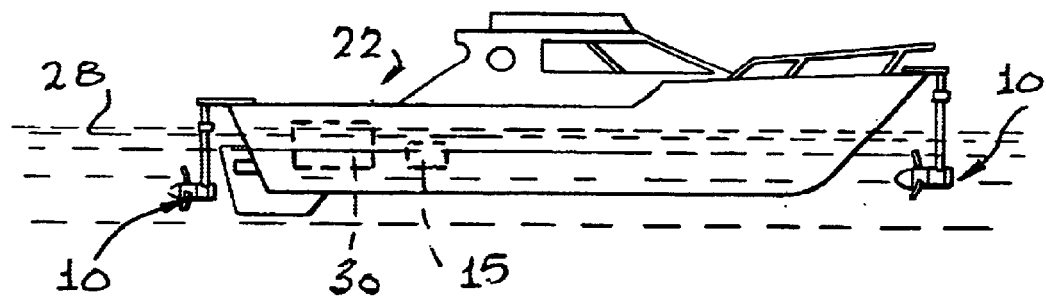
FIG. 2 is a side elevational view of a marine vessel incorporating the trolling and battery recharging system of the present invention.

With reference now to FIG. 2, when intending to use the device 10 of the present invention as a trolling motor, the device is secured to the boat 22 and extended downwardly into the water 28. Electrical power is then supplied from the battery through leads 16 to the device 10 such that the propeller 14 is turned in normal fashion to move the boat slowly forward. Due to the swivel connection 26 between the bracket 24 and arm 18, the device 10 can be turned a full 360° so as to maneuver the boat, or even cause the boat 22 to move in the reverse direction. Such trolling function is desirable when fishing, or even entering or leaving a harbor or the like. As illustrated in FIG. 2, the device 10 of the present invention can be placed at either the front or rear of the boat 22.

When the main engine 30 is to be powered, the generator/trolling device 10 of the present invention is turned 180° and preferably pitched upward approximately 5° and all power removed therefrom so that it does not serve as a trolling motor. Instead, when main motor 30 moves the marine vessel 22 at a greater velocity, the re-positioning of the generator/trolling device 10 causes the propeller 14 to spin due to the water flow and current flowing over the propeller 14. This action causes the shaft and its accompanying bushings and windings to rotate within the motor housing 12. This in turn creates electromagnetic charges between the windings, bushings and magnets within the motor housing 12 which relay electricity through electrical leads 16 to the battery system (not shown).

Although the generator/trolling device 10 could potentially include its own battery cell which could be used to power propeller 14, and be recharged by the method described above, it is preferable that the electrical lead 16 actually be used to attach to a larger battery which can also be used to power electrical lights, depth finders, etc. Such configuration also enables the device 10 of the present invention to be relatively small and lightweight for easy manipulation and storage.

Although several embodiments have been described in detail for purposes of illustration, various modifications may be made without departing from the scope and spirit of the invention. Accordingly, the invention is not to be limited, except as by the appended claims.

What is claimed is:

1. A marine vessel trolling and battery recharging system, comprising:
   a marine vessel having a main engine;
   an electric generator/trolling device having a propellor, the device being extendible downwardly from the vessel and into the water; and
   a battery electrically couple to the generator/trolling device;
   wherein positioning the generator/trolling device in a first orientation and supplying electric power thereto causes the propellor to turn and serve as a trolling motor; and
   wherein positioning the generator/trolling device in a second orientation and powering the main engine causes water to flow over the propellor so that it turns and recharges the battery.

2. The system of claim 1, including a bracket attachable to the marine vessel and having an arm extending downwardly therefrom for supporting the generator/trolling device in the water.

3. The system of claim 2, wherein the arm is pivotally attached to the bracket to enable the generator/trolling device to be moved from the first and second orientations.

4. The system of claim 2, wherein the arm is selectively extendible in length.

5. A marine vessel trolling and battery recharging system, comprising:
   a marine vessel having a main engine;
   bracket attachable to the marine vessel;
   an arm pivotally attached to the bracket and being adjustable in length so as to extend downwardly from the marine vessel and into the water;
   an electric generator/trolling device having a propellor attached to a lower end of the arm; and
   a battery electrically coupled to the generator/trolling device;
   wherein positioning the generator/trolling device in a first orientation and supplying electric power thereto causes the propellor to turn and serve as a trolling motor; and
   wherein positioning the generator/trolling device in a second orientation and powering the main engine causes water to flow over the propellor so that it turns and recharges the battery.

* * * * *